(12) United States Patent
Mohara et al.

(10) Patent No.: US 11,977,026 B2
(45) Date of Patent: May 7, 2024

(54) FAR-INFRARED SPECTROSCOPY DEVICE AND FAR-INFRARED SPECTROSCOPY METHOD

(71) Applicant: Hitachi High-Tech Corporation, Tokyo (JP)

(72) Inventors: Mizuki Mohara, Tokyo (JP); Kei Shimura, Tokyo (JP); Kenji Aiko, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 212 days.

(21) Appl. No.: 17/781,259

(22) PCT Filed: Dec. 27, 2019

(86) PCT No.: PCT/JP2019/051387
§ 371 (c)(1),
(2) Date: May 31, 2022

(87) PCT Pub. No.: WO2021/131014
PCT Pub. Date: Jul. 1, 2021

(65) Prior Publication Data
US 2022/0412885 A1    Dec. 29, 2022

(51) Int. Cl.
*G01N 21/3581*    (2014.01)
*G01J 3/10*    (2006.01)
(Continued)

(52) U.S. Cl.
CPC .......... *G01N 21/3581* (2013.01); *G01J 3/108* (2013.01); *G01J 3/14* (2013.01); *G01J 3/2803* (2013.01); *G02F 1/3551* (2013.01)

(58) Field of Classification Search
CPC ........ G01N 21/3581; G01J 3/108; G01J 3/14; G01J 3/2803; G02F 1/3551
(Continued)

(56) References Cited

U.S. PATENT DOCUMENTS

2003/0227668 A1* 12/2003 Imai .......................... G02F 1/39
359/326
2020/0371023 A1    11/2020 Shimura et al.

FOREIGN PATENT DOCUMENTS

WO    WO 2019/116461 A1    6/2019

OTHER PUBLICATIONS

International Search Report (PCT/ISA/210) issued in PCT Application No. PCT/JP2019/051387 dated Mar. 17, 2020 with English translation (six (6) pages).

(Continued)

*Primary Examiner* — Md M Rahman
(74) *Attorney, Agent, or Firm* — Crowell & Moring LLP

(57) ABSTRACT

This invention addresses the abovementioned problem, and the purpose of this invention is to provide a far-infrared spectroscopy device that uses an is-TPG method to generate far-infrared light, and is capable of efficiently detecting is-TPG light without a detection optical system being fine-tuned. Even if the far-infrared light incidence angles on an Si prism for detection are the same when far-infrared light having a first frequency is incident on a non-linear optical crystal for detection and when far-infrared light having a second frequency is incident on the non-linear optical crystal for detection, this far-infrared spectroscopy device adjusts the incidence surface angle of pump light in relation to the non-linear optical crystal for detection such that the angle of the far-infrared light in relation to the pump light within the non-linear optical crystal for detection can be appropriately set for each far-infrared light frequency (see FIG. 1A).

13 Claims, 4 Drawing Sheets

(51) Int. Cl.
*G01J 3/14* (2006.01)
*G01J 3/28* (2006.01)
*G02F 1/355* (2006.01)

(58) Field of Classification Search
USPC .......................................................... 356/326
See application file for complete search history.

(56) References Cited

OTHER PUBLICATIONS

Japanese-language Written Opinion (PCT/ISA/237) issued in PCT Application No. PCT/JP2019/051387 dated Mar. 17, 2020 (three (3) pages).

* cited by examiner

FAR-INFRARED SPECTROSCOPY DEVICE AND FAR-INFRARED SPECTROSCOPY METHOD

TECHNICAL FIELD

The present invention relates to a far infrared spectrometry apparatus that analyzes a sample using light in a far infrared region.

BACKGROUND ART

Far infrared light, which is also referred to as a terahertz wave, has permeability to a material and an absorption spectrum unique to the material. Accordingly, the infrared light is expected to be useful in analyzing a material by obtaining the absorption spectrum of the material having low permeability to visible light or infrared light or the material enclosed in a shield. As one technique in this field, there is known a time domain spectroscopy (TDS: Time Domain Spectroscopy) method. While the TDS is useful for component identification and quantitative analysis of medicine, it has a problem of a narrow dynamic range. Thus, it may be possible to measure, for example, a tablet-like sample which is a few millimeters thick using an is-TPG (injection-seeded THz Parametric Generator) method with high peak power.

Patent Literature 1 discloses a far infrared light source that uses the is-TPG method. The document discloses a technology in which "The present invention provides a far-infrared light source capable of reducing the shift in the location irradiated with far-infrared light even when the frequency of the far-infrared light changes. A far-infrared light source according to the present invention is configured so that the variation in the emission angle of far-infrared light in a nonlinear optical crystal when the frequency of the far-infrared light changes is substantially offset by the variation in the refractive angle of the far-infrared light at an interface between the nonlinear optical crystal and a prism when the frequency of the far-infrared light changes" (see abstract).

CITATION LIST

Patent Literature

Patent Literature 1: WO2019/116461

SUMMARY OF INVENTION

Technical Problem

In the is-TPG method, when generating a far infrared radiation, two beams of laser light (pumping light with high pulse energy and seed light with a single wavelength) are introduced to a generation nonlinear optical crystal to parametrically generate a pulsed far infrared radiation (is-TPG light) having a single wavelength. By changing the wavelength of the seed light or adjusting an incident angle to the nonlinear optical crystal, it is possible to change a frequency of the is-TPG light to be generated. By irradiating the sample with the generated is-TPG light and introducing the transmitted light to a detection nonlinear optical crystal, the light is converted into near infrared light to be detected.

An emission angle of the is-TPG light varies depending on its frequency. Therefore, it is required to fine tune a detection optical system according to the frequency when sweeping the frequency of the is-TPG light or to increase the size of an illumination optical system or the detection optical system when sweeping a wide frequency band. This is because an incident position of the is-TPG light to the detection optical system varies with respect to each frequency. This tends to increase the size and cost of the detection optical system.

By branching a portion of the pumping light entering the generation nonlinear optical crystal and redirecting it to enter the detection nonlinear optical crystal, it is possible to convert the is-TPG light into the near infrared light inside the detection nonlinear optical crystal. In order to maximize wavelength conversion efficiency inside the detection nonlinear optical crystal at this time, it is required to appropriately configure an angle of the is-TPG light to the pumping light with respect to each frequency of the is-TPG light. However, optically fine tuning the angle involves a certain level of difficulty. Moreover, if the angle vary among far infrared spectrometry apparatuses, signal intensity of near infrared light to be detected may vary among the apparatuses.

Patent Literature 1 aims to reduce a difference between emission angles with respect to each frequency when generating the is-TPG light (see 0008 in the literature). However, in the literature, it is not sufficiently considered to guarantee an angle suitable for each frequency inside the detection nonlinear optical crystal when detecting the is-TPG light.

The present invention has been made in view of such problems as described above, and aims to provide a far infrared spectrometry apparatus that generates far infrared light using the is-TPG method, the far infrared spectrometry apparatus being capable of effectively detecting the is-TPG light without fine tuning the detection optical system or the detection nonlinear optical crystal.

Solution to Problem

A far infrared spectrometry apparatus according to an aspect of the present invention adjusts an incident surface angle of pumping light with respect to a detection nonlinear optical crystal so as to be able to appropriately configure an angle of far infrared light to the pumping light with respect to each frequency of the far infrared light inside the detection nonlinear optical crystal even if an incident angle of the far infrared light to a detection Si prism remains the same between when far infrared light having a first frequency enters the detection nonlinear optical crystal and when far infrared light having a second frequency enters the detection nonlinear optical crystal.

Advantageous Effects of Invention

The far infrared spectrometry apparatus according to an aspect of the present invention allows the far infrared spectrometry apparatus that generates far infrared light using the is-TPG method to effectively detect the is-TPG light without fine tuning the detection optical system or the detection nonlinear optical crystal with respect to each frequency.

DESCRIPTION OF EMBODIMENTS

First Embodiment: Configuration of Far Infrared Light Source

Figure 1A:
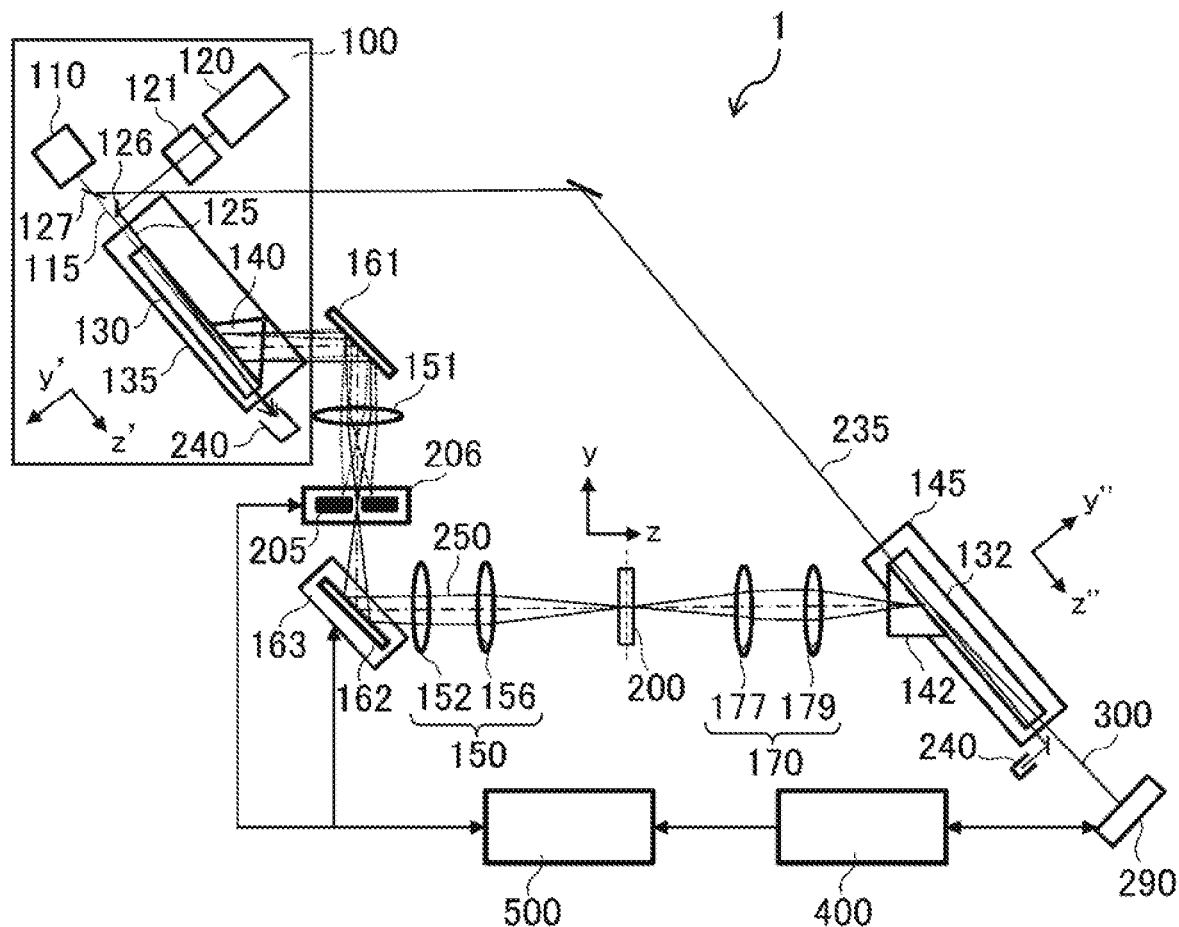
FIG. 1A is a schematic side view showing an overall configuration of a far infrared spectrometry apparatus 1 according to a first embodiment.

FIG. 1A is a schematic side view showing an overall configuration of a far infrared spectrometry apparatus 1 according to a first embodiment of the present invention. The far infrared spectrometry apparatus 1 is an apparatus that analyzes a sample 200 by irradiating the sample 200 with far infrared light. The far infrared spectrometry apparatus 1 includes a wavelength variable far infrared light source 100, an illumination optical system 150, a detection optical system 170, a detection nonlinear optical crystal 132, a photodetector 290, a control section 500, and a signal processing section 400.

The wavelength variable far infrared light source 100 introduces laser light beams having different wavelengths (pumping light beam 115 and seed light beam 125) into a generation nonlinear optical crystal 130 and generates a far infrared light beam 250 by difference frequency generation or parametric generation. This technique is referred to as an is-TPG method. In the following, the far infrared light generated by the is-TPG method is referred to as is-TPG light.

A pulse laser light source 110 emits the pumping light beam 115, and a wavelength variable light source 120 emits the seed light beam 125. A portion of the pumping light beam 115 is branched by a branching element 127 such as a half mirror and introduced into the detection nonlinear optical crystal 132 as a pumping light beam 235. An incident angle adjustment mechanism 121 adjusts an incident angle at which the seed light beam 125 enters the generation nonlinear optical crystal 130. A mirror 126 reflects the seed light beam 125 toward the generation nonlinear optical crystal 130.

For example, by using MgO:LiNbO$_3$ as the generation nonlinear optical crystal 130, using a pulse oscillation Q switching YAG laser (wavelength: 1064 nm) as the pulse laser light source 110, and inputting the seed light beam 125 emitted by the wavelength variable light source 120 to the generation nonlinear optical crystal 130, far infrared light beam 250 can be obtained by the parametric generation. The wavelength variable light source 120 may be a continuous oscillation laser. By attaching a generation Si prism 140 to a side of the generation nonlinear optical crystal 130, it is possible to efficiently extract the generated far infrared light beam 250. By varying the wavelength of the seed light beam 125 between about 1066 nm and 1084 nm and further adjusting the incident angle of the seed light beam 125 to the generation nonlinear optical crystal 130, it is possible to change the frequency of the far infrared light beam 250 (is-TPG light) to be generated in a range between 0.5 THz and 5 THz.

Figure 1B:
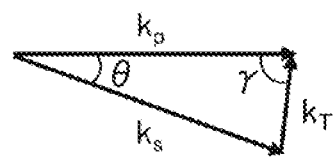
FIG. 1B is a vector diagram showing relations among respective light beams.

FIG. 1B is a vector diagram showing relations among respective light beams. Assuming the frequency of the far infrared light beam 250 to be generated as $\omega_T$, the frequency of the pumping light beam 115 as $\omega_P$, and the frequency of the seed light beam 125 as $\omega_S$, $\omega_T=\omega_P-\omega_S$ (Equation 1) is established. Further assuming wave number vectors of the far infrared light beam 250, the pumping light beam 115, and the seed light beam 125 as $k_T$, $k_P$, $k_S$, respectively, $k_T=k_P-k_S$ (Equation 2) is established. The generated far infrared light beam 250 (0.5 THz–5 THz) is extracted into the air via the generation Si prism 140 at an angle of about 48° to 36° with respect to the pumping light beam 115.

Since LiNbO$_3$ being used as the generation nonlinear optical crystal 130 strongly absorbs the far infrared light of 3 THz or higher, the pumping light beam 115 and the seed light beam 125 are introduced to a position as closely as possible to a facet of the generation nonlinear optical crystal 130, thereby reducing as much as possible the distance which the far infrared light beam 250 to be generated travels inside the generation nonlinear optical crystal 130. This is because the shorter the travel distance of the far infrared light beam 250 inside the generation nonlinear optical crystal 130 is, the more far infrared light beam 250 to be absorbed by the generation nonlinear optical crystal 130 can be suppressed. On one hand, by inputting the pumping light beam 115 and the seed light beam 125 as closely as possible to the facet side of the generation nonlinear optical crystal 130 and generating the far infrared light having a low frequency of 1 THz or lower, it is possible to suppress absorption of the far infrared light having the low frequency inside the generation nonlinear optical crystal 130. On the other hand, however, because the light of the pumping light beam 115 is not vignetted by a crystal edge and all the energy can be introduced into the crystal, an optical path length is shortened where an interaction occurs between the pumping light beam 115 and the far infrared light beam 250, and therefore an efficiency of generating the far infrared light beam 250 is also reduced. This may prevent efficient generation of the far infrared light beam 250, which is a problem.

Thus, when generating the far infrared light having the low frequency of 1 THz or lower, by applying the pumping light beam 115 and the seed light beam 125 near the near-center of the generation nonlinear optical crystal 130, all the energy can be introduced into the crystal without the light of the pumping light beam 115 being vignetted by the crystal edge. This extends the distance which the far infrared light beam 250 travels inside the generation nonlinear optical crystal 130 induced by the pumping light beam 115 until the far infrared light beam 250 exits to the outside of the generation nonlinear optical crystal 130, whereby a longer distance can be guaranteed where the interaction occurs between the pumping light beam 115 and the far infrared light beam 250. It should be noted that, because there is only a small absorption of the far infrared light having the low frequency of 1 THz or lower inside the generation nonlinear optical crystal 130, generating the far infrared light near the center of the crystal does not matter.

In the first embodiment, using an automatic translation stage 135, the generation nonlinear optical crystal 130 and the generation Si prism 140 are moved in a direction of a y' axis with respect to the pumping light beam 115 depending on the frequency of the far infrared light beam 250. This changes the positions where the pumping light beam 115 and the seed light beam 125 enter the generation nonlinear optical crystal 130. In this manner, it is possible to guarantee the optical path length of the far infrared light beam 250 having a low frequency of 1 THz or lower for a sufficiently long time, where an interaction occurs between the pumping light beam 115 and the far infrared light beam 250, and it is possible to efficiently generate the far infrared light beam 250 having a high frequency of 3 THz or higher without being absorbed inside the crystal.

Excess light emitted from the generation nonlinear optical crystal 130 is recovered and destroyed by a dumper 240. Similarly, excess light emitted from the detection nonlinear optical crystal 132 is also recovered and destroyed by the dumper 240.

First Embodiment: Configuration for Removing TPG Light

Inside the generation nonlinear optical crystal 130, although only slightly, there is generated far infrared light (TPG light) having a broad frequency, which is generated depending on the pumping light beam 115 but not on the seed light beam 125. The TPG light is, along with the far infrared light beam 250, transmitted through the sample 200, introduced into the detection nonlinear optical crystal 132, wavelength-converted into near-infrared radiation having a broad frequency by the pumping light beam 235, and detected by the photodetector 290. This signal influences stability of a detection signal because it is a noise to the detection signal generated by the is-TPG light. Furthermore, because the TPG light has instable outputs, which makes conversion efficiency unstable in the generation nonlinear optical crystal 130 and the detection nonlinear optical crystal 132, leading to a problem that the output of detection light beam 300 cannot be observed in a stable manner. Still further, there is also a problem that the wavelength conversion efficiency from the is-TPG light to the near infrared light is reduced in terms of the energy conservation law, because the energy of the pumping light beam 235 is used to convert the TPG light into the near infrared light.

As shown in FIG. 1B, although the generation nonlinear optical crystal 130 emits the far infrared light beam 250 at an angle γ corresponding to the frequency of the far infrared light beam 250, an emission angle of the TPG light does not change even if the wavelength of the seed light beam 125 is changed (i.e., even if the emission angle of the far infrared light beam 250 is changed) because the TPG light is a component generated by the presence of the pumping light beam 115. Therefore, when focusing the far infrared light beam 250 and the TPG light using a lens 151 via a mirror 161, the focused spot should be spatially different between the far infrared light beam 250 and the TPG light. Accordingly, it is possible to remove only the TPG light using a slit 205 (light shielding member) disposed in an automatic translation stage 206.

The TPG light cannot be removed by a polarizer or the like because the TPG light and the far infrared light beam 250 have the same polarization. In addition, the TPG light and the far infrared light beam 250 are generated as substantially the same pulsed light in a time domain. It is therefore believed to be suitable to spatially remove the TPG light by the slit 205. In addition to the slit 205, an iris, a pinhole, a knife edge, and the like may be used as the light shielding member. A width of the slit 205, an aperture of the iris, a size of the pinhole, and the like are preferably made as small as possible to a degree that the far infrared light beam 250 is not removed. A material of the light shielding member may be a resin capable of absorbing the TPG light or a metal that reflects the TPG light.

When the frequency of the far infrared light beam 250 is changed by changing the wavelength of the seed light beam 125, a mutation burden Δ of the beam spot focused by the lens 151 (focal length f) changes according to $\Delta = f\theta$ (Equation 3). θ is an emission angle of the far infrared light beam 250. It is possible to constantly extract only the far infrared light beam 250 at a desired frequency by moving the automatic translation stage 206 according to Equation 3.

Owing to the above configuration, because the TPG light is not introduced into the detection nonlinear optical crystal 132 along with the far infrared light beam 250, it is possible to efficiently wavelength-convert the far infrared light beam 250 alone and obtain the detection light beam 300 with a stable output. Moreover, because the energy of the pumping light beam 235 is not used to convert the TPG light into the near-infrared during the wavelength conversion, it is possible to improve the conversion efficiency of the far infrared light beam 250.

A combination of the method of removing the TPG light using the slit 205 and the above-mentioned method of moving the generation nonlinear optical crystal 130 by the automatic translation stage 135 can extend the frequency band for detection by the photodetector 290.

First Embodiment: Configuration of Optical System

At the time of optical adjustment during manufacture of the far infrared spectrometry apparatus 1, an optical axis of the pumping light beam 115, the seed light beam 125, or both of them is adjusted so that the is-TPG light reaches its maximum output. When manufacturing a plurality of far infrared spectrometry apparatuses 1, the generation position or the emission angle of the is-TPG light may vary among the apparatuses depending on a slight difference of the optical axis. It is difficult to control the difference between apparatuses, and there is a problem that all the positions of the sample 200, the detection optical system 170, and the detection nonlinear optical crystal 132 must be adjusted.

Now, the generated is-TPG light (far infrared light beam 250) is reflected by the mirror 161, passed through the slit 205, and reflected toward the sample 200 by a mirror 162 mounted on a rotary stage 163. The emission angle of the far infrared light beam 250 is changed by changing the frequency of the far infrared light beam 250, and an angle of the mirror 162 may preferably be corrected using the rotary stage 163. With such a configuration that the center of rotation of the rotary stage 163 is located on a surface of the mirror 162 and that the center of rotation of the mirror 162 and the generation position of the far infrared light beam are in a mirror image relation, the far infrared light beam 250 will constantly enter the center of rotation of the mirror 162 even if the frequency is changed. The above-mentioned mirror image relation may be adjusted in accordance with the position of the lens 151 in the direction of the optical axis. Moreover, because the angle of the far infrared light beam 250 does not depend on the frequency with regard to the light in a direction perpendicular to the surface of paper, only the direction parallel to the surface of paper should be considered.

The far infrared light beam 250 reflected by the mirror 162 is converted into parallel light by a lens 152 and focused on the sample 200 by a lens 156. In this manner, even when the frequency of the far infrared light beam 250 is changed, the far infrared light beam 250 is applied constantly to the same position on the sample 200.

By using the above-described configuration of the illumination optical system 150, it is possible to easily correct the direction and the position of the far infrared light beam 250 using the mirrors 161 and 162 and the lens 151 even among a plurality of far infrared spectrometry apparatuses 1.

The detection optical system 170 includes lenses 177 and 179. The lens 177 converts the far infrared light beam 250 having passed through the sample 200 into the parallel light. The lens 179 focuses the far infrared light beam 250 on the detection Si prism 142. The illumination optical system 150/the detection optical system 170/a stage 145 are adjusted so that an incident angle of the far infrared light beam 250 to the detection Si prism 142 is γ" as described later.

First Embodiment: Configuration of Detection System

The far infrared light beam 250 having passed through the sample 200 is introduced into the detection nonlinear optical crystal 132 via the detection optical system 170 and the detection Si prism 142. The far infrared light beam 250 is wavelength-converted into the near infrared light (detection light beam 300) near the wavelength of 1066 nm-1084 nm by the detection nonlinear optical crystal 132. The detection light beam 300 is photoelectrically converted by the photodetector 290 sensitive to the near infrared light, and detected as the detection signal.

Figure 2A:
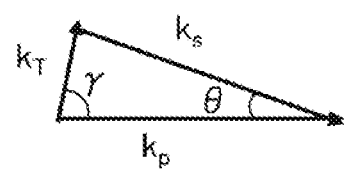
FIG. 2A is a diagram showing relations among wave number vectors of respective light beams in a detection system.

FIG. 2A is a diagram showing relations among wave number vectors of respective light beams in a detection system. The vector relations among respective light beams can be represented as shown in FIG. 2A as with the time of generation. In order to effectively perform the wavelength conversion by the detection nonlinear optical crystal 132, it is required to appropriately configure the angle γ formed by the far infrared light beam 250 to the pumping light beam 235. Because γ changes as the frequency of the far infrared light beam 250 changes, in order to guarantee an appropriate γ, for example, it is required to move the detection nonlinear optical crystal 132 and the detection Si prism 142 by the stage 145 (or change the angle there between). However, to perform such fine tuning, control accuracy of the stage 145 and the like must be appropriately guaranteed, which complicates the apparatus configuration.

Therefore, in the first embodiment, the angle of the far infrared light beam 250 inside the detection nonlinear optical crystal 132 (i.e., angle γ in FIGS. 2A and 2B) is adjusted using a refraction phenomenon observed when the far infrared light beam 250 enters the detection Si prism 142 and the detection nonlinear optical crystal 132.

Figure 2B:
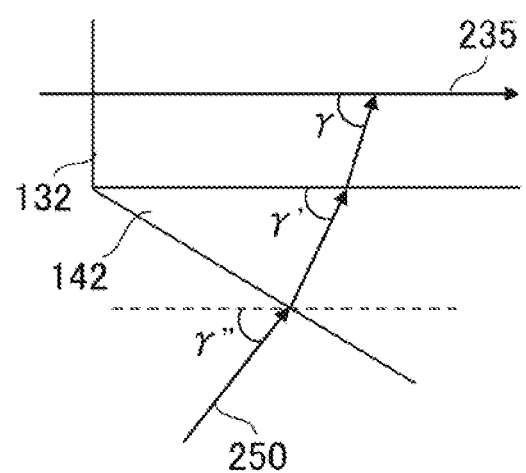
FIG. 2B is an enlarged view of a portion where a far infrared light beam 250 enters a detection Si prism 142 and a detection nonlinear optical crystal 132.

FIG. 2B is an enlarged view of a portion where the far infrared light beam 250 enters the detection Si prism 142 and the detection nonlinear optical crystal 132. The far infrared light beam 250 is refracted at an interface of the detection Si prism 142 when entering the same, and further refracted at an interface of the detection nonlinear optical crystal 132 when entering the same. It is required to appropriately set the angle γ of the far infrared light beam 250 to the pumping light beam 235 with respect to each frequency.

Figure 2C:
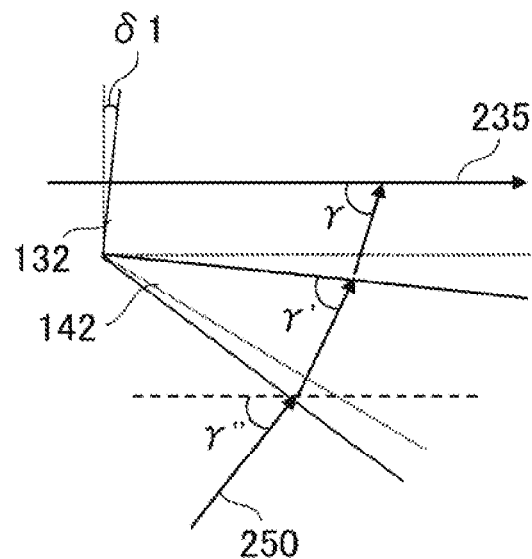
FIG. 2C is a diagram showing a case in which the detection Si prism 142 and the detection nonlinear optical crystal 132 are rotated by an angle δ1 around tips thereof.

FIG. 2C is a diagram showing a case in which the detection Si prism 142 and the detection nonlinear optical crystal 132 are rotated by an angle δ1 around their tips. It is possible to appropriately set the angle γ inside the detection nonlinear optical crystal 132 by rotating the detection Si prism 142 and the detection nonlinear optical crystal 132 as shown in FIG. 2C with respect to each frequency of the far infrared light beam 250. However, it is difficult to perform such fine tuning with respect to each frequency in terms of control accuracy and the like.

Figure 2D:
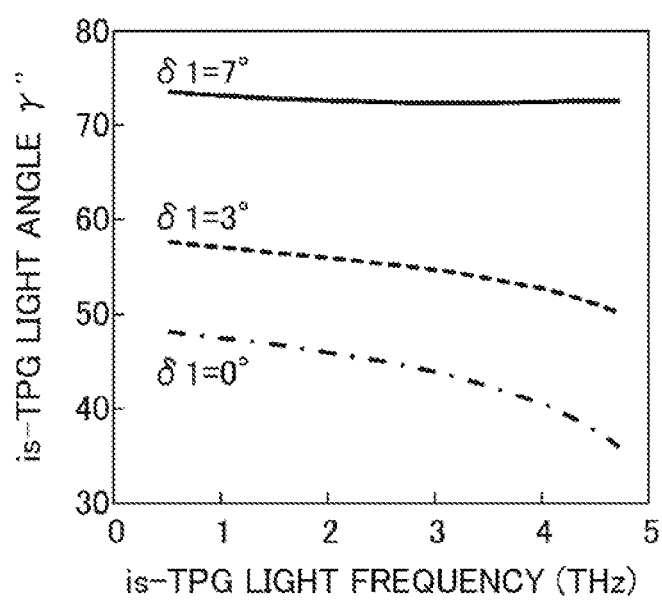
FIG. 2D shows example calculations illustrating relations among the angle δ1, a frequency of the far infrared light beam 250, and an angle γ" (an angle of the far infrared light beam 250 entering the detection Si prism 142)

FIG. 2D shows example calculations illustrating relations among the angle δ1, the frequency of the far infrared light beam 250, and the angle γ" (an angle of the far infrared light beam 250 entering the detection Si prism 142). There are shown examples of the angle δ1=0°, 3°, and 7°. In order to guarantee an appropriate angle γ inside the detection nonlinear optical crystal 132, it is required to set the incident angle γ" to the detection Si prism 142 appropriately. The appropriate incident angle γ" changes according to the frequency of the far infrared light beam 250. Furthermore, it can be seen that the relation between the frequency and γ" also changes when δ1 is changed.

It can be seen from FIG. 2D that there is the smallest variation of the appropriate incident angle γ" accompanying change in the frequency of the far infrared light beam 250 when δ1=7°. The inventors found that there exits such an angle δ1. Hence, it was determined in the first embodiment to set the angle δ1 by the stage 145 so that the variation of the angle γ" accompanying the frequency change is the smallest (δ1=7° in the example of FIG. 2D). In this manner, it is possible to efficiently generate the detection light beam 300 without requiring any complex correction mechanism for the incident angle γ" over the wide frequency band of the far infrared light beam 250.

For characteristics of δ1 (δ1=7° in the example of FIG. 2D) having the smallest change of γ" accompanying the frequency change, there are preferably two or more frequencies having the same γ". For example, in the example of δ1=7° shown in FIG. 2D, values of γ" are the same near 1.5 THz and near 4.0 THz. Furthermore, it is also desirable that γ" is within substantially the same range (in this example, the difference from γ" near 1.5 THz is within an allowable range and the difference from γ" near 4.0 THz is also within the allowable range) in the frequency bands therebefore and thereafter.

The desirable δ1 (δ1=7° in the example of FIG. 2D) may be set in advance before analyzing the sample 200 using the far infrared spectrometry apparatus 1, or an appropriate value of δ1 may be searched for after the start of measurement. In either case, while changing the angles of the detection Si prism 142 and the detection nonlinear optical crystal 132 by the stage 145, the appropriate γ" may be set and also such δ1 may be searched for that the change of γ" is the smallest when the frequency is changed (e.g., such δ1 that γ" is the same at two frequencies). The stage 145 may be controlled by the control section 500. Similarly, the automatic translation stage 135 can be controlled by the control section 500.

First Embodiment: Configuration for Detecting Near Infrared Light

The detection light beam 300 converted from the far infrared light is detected by the photodetector 290. The photodetector 290 may be a light receiving element (1D array detector) that includes a plurality of light receiving elements arranged in a one-dimensional array, or may be a light receiving element (2D array detector) that includes a plurality of light receiving elements arranged in a twodimensional array. The 1D array detector or the 2D array detector for near infrared is rather easily available, quickly responsive, and usable at room temperature. Accordingly, these detectors are suitable for industrial applications. The signal processing section 400 subtracts a signal intensity from a measured signal at the time when the far infrared radiation is blocked later in order to prevent reduction of S/N ratio arising from the noise of the photodetector 290, the noise from the scattered light of the visible light or the near infrared light inside the apparatus, or the like. When the detection light is too small for the size of the photodetector 290, an integral of a specific range where the detection light is present on the photodetector 290 may preferably be sent to the signal processing section 400 as the detection light intensity. Moreover, when the frequency is swept, the beam position of the detection light beam 300 is changed, and therefore the range of the signals to be processed may be followed. As with the detection light beam 300, noise components also have different intensities, and therefore it is required to measure the noise in the range corresponding to each frequency.

First Embodiment: Summary

The far infrared spectrometry apparatus 1 according to the first embodiment adjusts the angle δ1 of the incident surface of the pumping light beam 235 to the detection nonlinear optical crystal 132 so that the appropriate incident angle γ" of the far infrared light beam 250 to the detection Si prism 142 remains the same between when the far infrared light beam 250 having the first frequency (e.g., near 1.5 THz in FIG. 2D) enters the detection nonlinear optical crystal 132 and when the far infrared light beam 250 having the second frequency (e.g., near 4.0 THz in FIG. 2D) enters the detection nonlinear optical crystal 132. The appropriate incident angle γ" herein means an angle which can guarantee the angle γ efficient for converting the far infrared light beam 250 into the near infrared light inside the detection nonlinear optical crystal 132 in accordance with the frequency of the far infrared light beam 250. In this manner, it is possible to efficiently generate the detection light beam 300 without requiring any complex correction mechanism for the incident angle γ" in the wide frequency band of the far infrared light beam 250.

The far infrared spectrometry apparatus 1 according to the first embodiment blocks only the TPG light by adjusting the position of the slit 205 according to Equation 3 in a case in which the emission angle of the far infrared light beam 250 and the emission angle of the TPG light are different from each other. In this manner, it is possible to suppress the noise arising from the TPG light and also not to use the energy of the pumping light beam 235 for the TPG light.

The far infrared spectrometry apparatus 1 according to the first embodiment adjusts the angle of the far infrared light beam 250 by the mirror 162 so that the far infrared light beam 250 enters the detection Si prism 142 at the appropriate incident angle γ" even when the emission angle varies depending on the frequency of the far infrared light beam 250. In this manner, it is possible to constantly guarantee the angle γ with high conversion efficiency even when the frequency of the far infrared light beam 250 is changed. Furthermore, it is possible to constantly guarantee the angle γ with high conversion efficiency under the same incident angle γ" even without changing the angles of the detection Si prism 142 and the detection nonlinear optical crystal 132.

The far infrared spectrometry apparatus 1 according to the first embodiment adjusts the position of the generation nonlinear optical crystal 130 by the automatic translation stage 135 so that the optical path length where the interaction occurs between the pumping light beam 115 and the far infrared light beam 250 can be kept as long as possible in the generation nonlinear optical crystal 130 in accordance with the frequency of the far infrared light beam 250. In this manner, it is possible to keep the optical path length where the interaction occurs between the pumping light beam 115 and the far infrared light beam 250 as long as possible over the wide frequency range and to efficiently generate the far infrared light beam 250.

Second Embodiment

In the first embodiment, a configuration example was described which guarantees the conversion efficiency on the detection side without fine tuning γ" by adjusting the angle δ1 of the pumping light beam 235 to the detection nonlinear optical crystal 132. A similar angle adjustment may also be performed on the generation nonlinear optical crystal 130. Therefore, in a second embodiment of the present invention, a configuration example will be described which adjusts an angle of the incident surface which the pumping light beam 115 enters on the generation side in addition to the detection side.

Figure 3A:
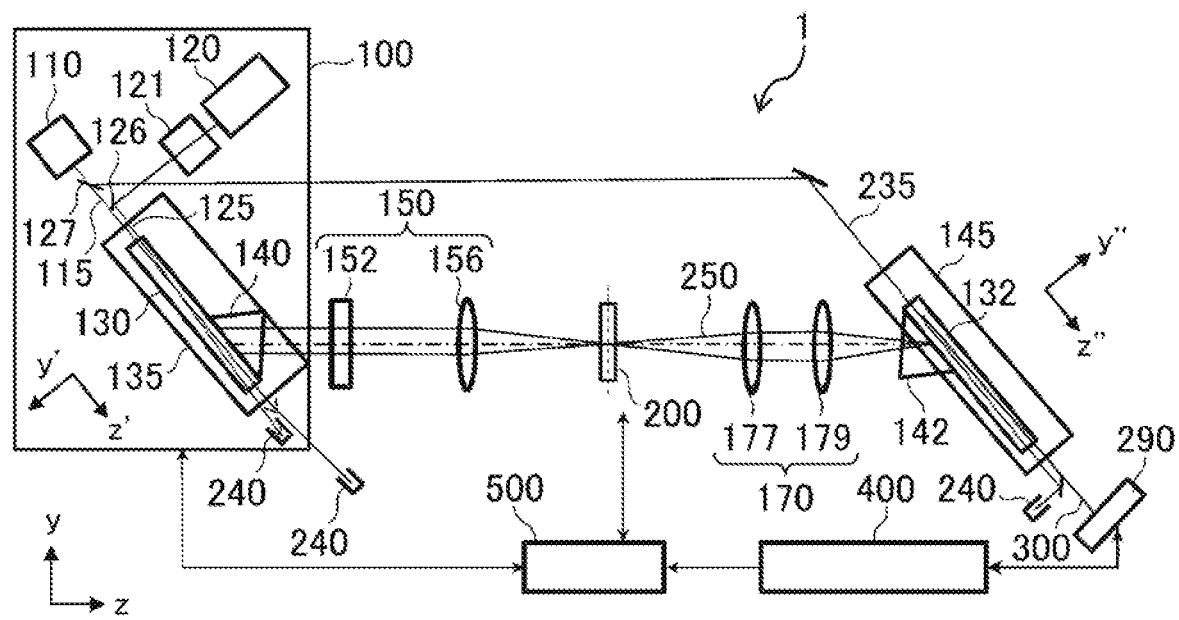
FIG. 3A is a schematic side view showing an overall configuration of the far infrared spectrometry apparatus 1 according to a second embodiment.

FIG. 3A is a schematic side view showing an overall configuration of the far infrared spectrometry apparatus 1 according to the second embodiment. In the configuration shown in FIG. 3A, optical elements from the mirror 161 to the mirror 162 are omitted as compared to the configuration in FIG. 1A. The remainder of the configuration is similar to that in the first embodiment. As described below, however, an angle δ2 of the incident surface where the pumping light beam 115 enters the generation nonlinear optical crystal 130 should be adjusted.

Figure 3B:
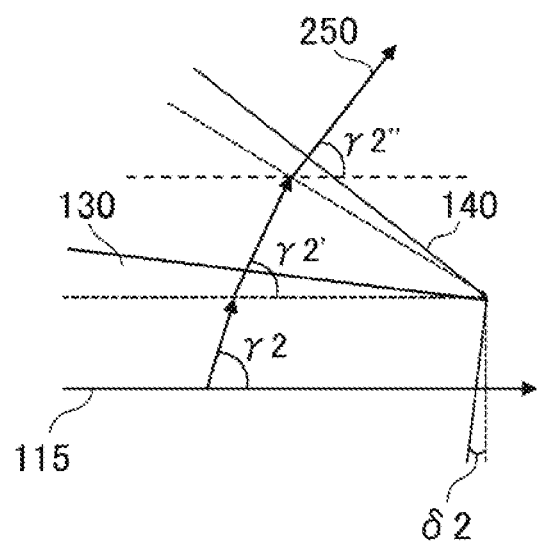
FIG. 3B is an enlarged view of a portion where the far infrared light beam 250 exits the detection Si prism 142 and a generation nonlinear optical crystal 130.

FIG. 3B is an enlarged view of a portion where the far infrared light beam 250 exits the detection Si prism 142 and the generation nonlinear optical crystal 130. Inside the generation nonlinear optical crystal 130, the far infrared light beam 250 is generated forming an angle γ2 with respect to the pumping light beam 115. The far infrared light beam 250 is refracted at an interface between the generation Si prism 140 and the generation nonlinear optical crystal 130, and also refracted at an interface between the generation Si prism 140 and the air. An emission angle with respect to the pumping light beam 115 is γ2", γ2, γ2', and γ2" change with respect to each frequency of the far infrared light beam 250.

There is a relation similar to that in FIG. 2D between the generation Si prism 140 and the generation nonlinear optical crystal 130. That is, there is the angle δ2 of the incident surface so that γ2" remains substantially constant even when the frequency of the far infrared light beam 250 is changed. Thus, in the second embodiment, the angle δ2 is formed by the automatic translation stage 135 inclining the generation Si prism 140 and the generation nonlinear optical crystal 130. In this manner, even if the frequency of the far infrared light beam 250 is changed, it does not matter if the size of the optical system such as the illumination optical system 150 is reduced because the emission angle γ2" of the far infrared light beam 250 will not be substantially changed and there is no need of correcting the position of the sample 200 to be irradiated because the position will not be changed.

It should be noted that, as in the first embodiment, the positions of the generation nonlinear optical crystal 130 and the generation Si prism 140 are preferably be moved with respect to the generation Si prism 140 so as to be in appropriate positions by the automatic translation stage 135 when changing the frequency of the far infrared light beam 250. Furthermore, the angle δ2 may be searched for by the automatic translation stage 135 as in the first embodiment.

The far infrared light beam 250 having passed through the sample 200 is introduced into the detection nonlinear optical crystal 132 via the detection Si prism 142 as in the first embodiment. As in the first embodiment, the detection nonlinear optical crystal 132 and the detection Si prism 142 are inclined by the angle δ1. In this manner, it is possible to demonstrate an effect similar to that in the first embodiment on the detection side as well.

In the second embodiment, because the optical elements from the mirror 161 to the mirror 162 are omitted, it is possible to reduce the size of the far infrared spectrometry apparatus 1 and suppress the cost. However, because there is no slit 205 or the like that removes the TPG light, it is desirable to use the second embodiment in an application that can allow the noise or energy consumption caused by the TPG light. To the contrary, in the first embodiment, the emission angle of the far infrared light beam 250 and the emission angle of the TPG must be different from each other to remove the TPG light using the slit 205 or the like. Therefore, the configuration of the second embodiment should not be used for the wavelength variable far infrared light source 100.

<Modification of the Invention>

In the above embodiments, for example, the far infrared spectrometry apparatus 1 can be used in a quantitative analysis or a qualitative analysis of component content of a chemical substance in the sample 200, or in an inspection step such as an inspection for a foreign substance in the sample 200. The far infrared spectrometry apparatus 1 can also be used in other appropriate applications for analyzing the sample 200 using the far infrared light beam 250.

In the above embodiments, the control section 500 can control the entire far infrared spectrometry apparatus 1. The signal processing section 400 and the control section 500 can be configured with hardware such as a circuit device implemented with the function, or can be configured by a computing device executing software implemented with the function.

LIST OF REFERENCE SIGNS

1: Far infrared spectrometry apparatus
100: Wavelength variable far infrared light source
110: Pulse laser light source
120: Wavelength variable light source
115, 235: Pumping light beam
125: Seed light beam
130: Generation nonlinear optical crystal
132: Detection nonlinear optical crystal
135: Automatic translation stage
140: Generation Si prism
142: Detection Si prism
145: Stage
150: Illumination optical system
152, 156: Lens
161, 162: Mirror
163: Rotary stage
200: Sample
205: Slit
206: Automatic translation stage
250: Far infrared light (is-TPG light)
290: Photodetector
300: Detection light
400: Signal processing section
500: Control section

The invention claimed is:

1. A far infrared spectrometry apparatus that analyzes a sample using far infrared light, comprising:
a wavelength variable far infrared light source that emits a wavelength variable first infrared light beam; and
a detection system that detects the first infrared light beam having passed through the sample,
wherein the wavelength variable far infrared light source is configured to input a pumping light beam and a seed light beam to a generation nonlinear optical crystal and to emit the first infrared light beam via a generation Si prism arranged adjacent to the generation nonlinear optical crystal,
wherein the detection system is configured to convert the first infrared light beam into near infrared light and emit the resulting near infrared light via a detection nonlinear optical crystal by inputting the first infrared light beam to a detection Si prism and inputting the pumping light beam to the detection nonlinear optical crystal arranged adjacent to the detection Si prism,
wherein the detection nonlinear optical crystal and the detection Si prism are arranged so that the first infrared light beam forms an angle corresponding to a first frequency with respect to the pumping light beam inside the detection nonlinear optical crystal when the first infrared light beam having the first frequency enters the detection Si prism at an incident angle that forms a first angle with respect to the pumping light beam,
wherein the detection nonlinear optical crystal and the detection Si prism are arranged so that the first infrared light beam forms an angle corresponding to a second frequency with respect to the pumping light beam inside the detection nonlinear optical crystal when the first infrared light beam having the second frequency enters the detection Si prism at an incident angle that forms a second angle with respect to the pumping light beam, and
wherein the detection nonlinear optical crystal is configured to equalize the first angle and the second angle by adjusting an angle δ1 between a normal line of an incident surface of the detection nonlinear optical crystal which the pumping light beam enters and the pumping light beam.

2. The far infrared spectrometry apparatus according to claim 1, further comprising:
a detection stage that adjusts the angle δ1 by moving or inclining the detection nonlinear optical crystal; and
a control section that controls the detection stage,
wherein the control section adjusts the angle δ1 so that the first infrared light beam forms an angle corresponding to the first frequency with respect to the pumping light beam inside the detection nonlinear optical crystal when the first infrared light beam having the first frequency enters the detection Si prism at an incident angle that forms the first angle with respect to the pumping light beam,
wherein the control section adjusts the angle δ1 so that the first infrared light beam forms an angle corresponding to the second frequency with respect to the pumping light beam inside the detection nonlinear optical crystal when the first infrared light beam having the second frequency enters the detection Si prism at an incident angle that forms the second angle with respect to the pumping light beam, and wherein the control section adjusts the angle δ1 by searching for the angle δ1 such that the first angle is coincident with the second angle.

3. The far infrared spectrometry apparatus according to claim 1,
wherein the detection nonlinear optical crystal and the detection Si prism are arranged so that the first infrared light beam forms an angle corresponding to a third frequency with respect to the pumping light beam inside the detection nonlinear optical crystal when the first infrared light beam having the third frequency inters the detection Si prism at an incident angle that forms a third angle with respect to the pumping light beam, and
wherein the detection nonlinear optical crystal is configured to keep a difference between the first angle and the third angle within an allowable range and to keep a difference between the second angle and the third angle within the allowable range by adjusting the angle δ1.

4. The far infrared spectrometry apparatus according to claim 1,
wherein the generation nonlinear optical crystal is configured to generate the first infrared light beam and to generate a second far infrared light beam generated not depending on the seed light beam but depending on the pumping light beam, and
wherein the far infrared spectrometry apparatus further comprises a light shielding member that blocks the second far infrared light beam on an optical path of the first infrared light beam.

5. The far infrared spectrometry apparatus according to claim 4,
wherein the generation nonlinear optical crystal is configured to emit the first infrared light beam at a different angle in accordance with a frequency of the first infrared light beam, and
wherein the light shielding member is configured to pass the first infrared light beam and to block the second far infrared light beam by moving to a position corresponding to a frequency of the first infrared light beam.

6. The far infrared spectrometry apparatus according to claim 1,
wherein the far infrared spectrometry apparatus further comprises a mirror that reflects first infrared light beam toward the detection Si prism so as to enter the detection Si prism at an incident angle that forms the first angle or the second angle with respect to the pumping light beam.

7. The far infrared spectrometry apparatus according to claim 1,
wherein the far infrared spectrometry apparatus further comprises a stage that moves the generation nonlinear optical crystal, and
wherein the stage moves the generation nonlinear optical crystal to a position corresponding to an emission angle at which the generation nonlinear optical crystal emits the first infrared light beam.

8. The far infrared spectrometry apparatus according to claim 7,
wherein the generation nonlinear optical crystal is configured to emit the first infrared light beam at a different angle in accordance with a frequency of the first infrared light beam, and
wherein the stage moves the generation nonlinear optical crystal so as to extend an optical path length where an interaction occurs between the first infrared light beam and the pumping light beam in accordance with the emission angle.

9. The far infrared spectrometry apparatus according to claim 1,
wherein the generation nonlinear optical crystal and the generation Si prism are arranged so that the first infrared light beam forms an angle corresponding to a fourth frequency with respect to the pumping light beam inside the generation nonlinear optical crystal when the first infrared light beam having the fourth frequency is emitted from the generation Si prism at an emission angle that forms a fourth angle with respect to the pumping light beam,
wherein the generation nonlinear optical crystal and the generation Si prism are arranged so that the first infrared light beam forms an angle corresponding to a fifth frequency with respect to the pumping light beam inside the generation nonlinear optical crystal when the first infrared light beam having the fifth frequency is emitted from the generation Si prism at an emission angle that forms a fifth angle with respect to the pumping light beam, and
wherein the generation nonlinear optical crystal is configured to equalize the fourth angle and the fifth angle by adjusting an angle δ2 between a normal line of an incident surface of the generation nonlinear optical crystal which the pumping light beam enters and the pumping light beam.

10. The far infrared spectrometry apparatus according to claim 9, further comprising:
a generation stage that adjusts the angle δ2 by moving or inclining the generation nonlinear optical crystal, and
a control section that controls the generation stage,
wherein the control section adjusts the angle δ2 so that the first infrared light beam forms an angle corresponding to the fourth frequency with respect to the pumping light beam inside the generation nonlinear optical crystal when the first infrared light beam having the fourth frequency is emitted from the generation Si prism at an emission angle that forms the fourth angle with respect to the pumping light beam,
wherein the control section adjusts the angle δ2 so that the first infrared light beam forms an angle corresponding to a fifth frequency with respect to the pumping light beam inside the generation nonlinear optical crystal when the first infrared light beam is emitted from the generation Si prism at an emission angle that forms the fifth angle with respect to the pumping light beam, and
wherein the control section adjusts the angle δ2 by searching for the angle δ2 such that the fourth angle is coincident with the fifth angle.

11. The far infrared spectrometry apparatus according to claim 9,
wherein the generation nonlinear optical crystal and the generation Si prism are arranged so that the first infrared light beam forms an angle corresponding to a sixth frequency with respect to the pumping light beam inside the generation nonlinear optical crystal when the first infrared light beam having the sixth frequency is emitted from the generation Si prism at an emission angle that forms a sixth angle with respect to the pumping light beam, and
wherein the generation nonlinear optical crystal is configured to keep a difference between the fourth angle and the sixth angle within an allowable range and to keep a difference between the fifth angle and the sixth angle within the allowable range by adjusting the angle δ2.

12. The far infrared spectrometry apparatus according to claim 1,
wherein a wavelength of the seed light beam is in a range between 1066 nm and 1084 nm, and
wherein a frequency of the first infrared light beam is in a range between 0.5 THz and 5 THz.

13. A far infrared spectrometry method of analyzing a sample using far infrared light, comprising the steps of:
emitting a wavelength variable first infrared light beam from a wavelength variable far infrared light source; and
detecting the first infrared light beam having passed through a sample,
wherein the step of emitting the first infrared light beam includes inputting a pumping light beam and a seed light beam to a generation nonlinear optical crystal and emitting the first infrared light beam via a generation Si prism arranged adjacent to the generation nonlinear optical crystal,
wherein the step of detecting the first infrared light beam includes converting the first infrared light beam into near infrared light and emitting the resulting near infrared light via a detection nonlinear optical crystal by inputting the first infrared light beam to a detection Si prism and inputting the pumping light beam to the detection nonlinear optical crystal arranged adjacent to the detection Si prism,
wherein the detection nonlinear optical crystal and the detection Si prism are arranged so that the first infrared light beam forms an angle corresponding to a first frequency with respect to the pumping light beam inside the detection nonlinear optical crystal when the first infrared light beam having the first frequency enters the detection Si prism at an incident angle that forms a first angle with respect to the pumping light beam,
wherein detection nonlinear optical crystal and the detection Si prism are arranged so that the first infrared light beam forms an angle corresponding to a second frequency with respect to the pumping light beam inside the detection nonlinear optical crystal when the first infrared light beam having the second frequency enters the detection Si prism at an incident angle that forms a second angle with respect to the pumping light beam, and
wherein the step of detecting the first infrared light beam includes equalizing the first angle and the second angle by adjusting an angle δ1 between a normal line of an incident surface of the detection nonlinear optical crystal which the pumping light beam enters and the pumping light beam.

* * * * *